United States Patent [19]

Hussmann

[11] 4,219,341
[45] Aug. 26, 1980

[54] PROCESS AND PLANT FOR THE RECOVERY OF WATER FROM HUMID AIR

[75] Inventor: Peter Hussmann, Munich, Fed. Rep. of Germany

[73] Assignee: Mittex Aktiengesellschaft, Vaduz, Liechtenstein

[21] Appl. No.: 963,647

[22] Filed: Nov. 24, 1978

[30] Foreign Application Priority Data

Nov. 25, 1977 [DE] Fed. Rep. of Germany ....... 2752748

[51] Int. Cl.² .............................................. B01D 53/04
[52] U.S. Cl. ....................................... 55/179; 55/208; 55/387; 62/271
[58] Field of Search ....................................... 34/79–81, 34/DIG. 1; 55/31, 33, 34, 35, 74, 75, 208, 387, 389; 62/94, 271; 202/234; 203/10, 11, DIG. 1

[56] References Cited

U.S. PATENT DOCUMENTS

| | | | |
|---|---|---|---|
| 2,138,684 | 11/1938 | Altenkirch | 62/271 X |
| 2,138,689 | 11/1938 | Altenkirch | 203/DIG. 1 |
| 2,402,737 | 6/1946 | Delano | 203/DIG. 1 |
| 2,462,952 | 3/1949 | Dunkak | 55/208 |
| 3,866,428 | 2/1975 | Simonet et al. | 55/75 X |
| 4,010,080 | 3/1977 | Tsay et al. | 203/DIG. 1 |
| 4,081,024 | 3/1978 | Rush et al. | 62/271 X |

FOREIGN PATENT DOCUMENTS 16625 12/1934 Australia ....................................... 55/33

Primary Examiner—Robert H. Spitzer
Attorney, Agent, or Firm—Schwartz, Jeffery, Schwaab, Mack, Blumenthal & Koch

[57] ABSTRACT

Disclosed are a process and plant for the recovery of water from humid air, in which at night cool humid air is passed through an adsorbent medium layer which adsorbs water from the air and in which, by day, air heated by solar energy up to a temperature which is above the ambient temperature is passed first through this layer to absorb water from the layer and then is cooled down so that the water condenses. The daytime air, when entering the adsorbent layer, is heated by solar energy with a radiator which is preferably a black anodized aluminum web in which the adsorbent medium may be embedded and/or by the adsorbent medium layer which is colored black for better absorption of sun rays. By using reflectors, the solarization upon the adsorbent medium layer and/or the radiator may be intensified.

39 Claims, 3 Drawing Figures

PROCESS AND PLANT FOR THE RECOVERY OF WATER FROM HUMID AIR

BACKGROUND OF THE INVENTION

The invention concerns a process and a plant for the recovery of water from humid air, in which at night, humid air of lower temperature passes through a water storing adsorbent medium layer for the adsorption of water contained in the humid air and in which by day, air heated by means of solar energy and having a higher temperature which is higher than ambient temperature by day passes through the adsorbent medium layer for the desorption from the medium and adsorption by the air of the water extracted from the humid air by said layer at night. Subsequently the air is cooled for the condensation of the absorbed water which is conducted away after condensation.

This process will yield a relatively great amount of water if, among other things, the difference in temperature between the air passing through the adsorbent medium layer by day and the air passing through the adsorbent medium layer at night is large and if the air routed into the layer by day possesses a low relative humidity so that its absorption power for the water adsorbed by the adsorbent medium layer at night is correspondingly high.

A process is known from Offenlegungsschrift No. 26 24 392, in which at night humid air from the environment is passed first through a package of stones to be cooled by it and thereafter through a layer of silica gel seving as the adsorbing medium for the adsorption of water contained in the air. The silica gel is of a special type having an adsorption range between about 0° and 20° C. and a desorption range between about 25° and 70° C. Then, during the day, air from the environment is passed in reverse order first through the stone package cooled at night so that water adsorbed by the silica gel layer from the night air is extracted again by the air from the silica gel layer during the day and can be condensed on the stones, which have been cooled at night, and conducted away. Before entering the silica gel layer, the daytime air is heated by the adsorption of heat which is radiated by the surface of the silica gel layer, which is exposed to the sun rays, to a temperature which is above the outdoor temperature. The heating up of the air route into the silica gel layer to a higher temperature than the outdoor temperature is effected in the known process by passing the air between a translucent roof arranged above the silica gel layer and the surface of the silica gel layer which is exposed to the suns rays before it enters the silica gel layer. By this step, the so-called regenerative air is heated up to 52° C. at a mean daytime temperature of the outside air of e.g., 40° C. By taking suitable measures with the roof, a somewhat higher temperature of the regenerative air can be achieved.

This process known from the Offenlegungsschrift can be carried out only at places where the outdoor temperatures of the air at night are not above 20° C. and it can be carried out economically only in those places where the differences in temperature of the outside air between day and night are large, since the heating up of the air routed into the silica gel layer, effected by solarization, causes only a relative small temperature rise.

SUMMARY OF THE INVENTION

It is therefore an object of the invention to provide an improved process for recovering water from the air.

A specific object of the invention resides in developing the process of the kind referred to above so that it can be employed for economically recovering water from the air under those climatic conditions under which the above-mentioned process cannot be carried out at all or under which the known process becomes uneconomical.

It is also an object of the present invention to provide a plant for carrying out the improved process according to the present invention.

In accomplishing the foregoing objects, there has been provided in accordance with the present invention a process for recovering water from humid air, comprising the steps of passing humid night air at a first temperature through an adsorbent medium for adsorption of water contained in the humid air; passing daytime air through an air permeable dark colored layer exposed to the sun's rays, whereby the daytime air is heated up to a second temperature higher than said first temperature and higher than ambient daytime air temperature; passing the heated daytime air through the adsorbent medium to desorb the adsorbed water therefrom, whereby the water is absorbed by the daytime air; cooling the daytime air exiting from the adsorbent medium to a temperature sufficient to condense the absorbed water from the exiting air; and collecting the condensed water.

Also provided according to the present invention is a plant for carrying out the foregoing process. The plant comprises a layer of an air-permeable water adsorbent medium capable of adsorbing water from humid night air at a first temperature and desorbing the adsorbed water exposed to daytime at a second temperature higher than the first temperature; means for propelling a stream of ambient daytime air through the ambient medium layer to define an upstream and a downstream direction in the ambient daytime air stream; means, including at least one air-permeable dark colored layer oriented for exposure to the sun's rays and positioned upstream of the adsorbent medium layer in the stream of daytime air, for heating ambient daytime air to a higher temperature; and a condenser located downstream from the adsorbent medium layer in the stream of daytime air for removing water from the stream of daytime air after it has passed through the adsorbent medium layer. Preferably, the dark colored layer is either the surface layer of the adsorbent medium or a radiator member, or both together. Also preferably included is one or more reflectors for reflecting the sun's rays onto the radiator and/or surface of the adsorbent medium.

Other objects, features and advantages of the invention will become apparent from the detailed description of preferred embodiments which follows, when considered together with the attached drawings.

DETAILED DESCRIPTION OF PREFERRED EMBODIMENTS

Figure 1:
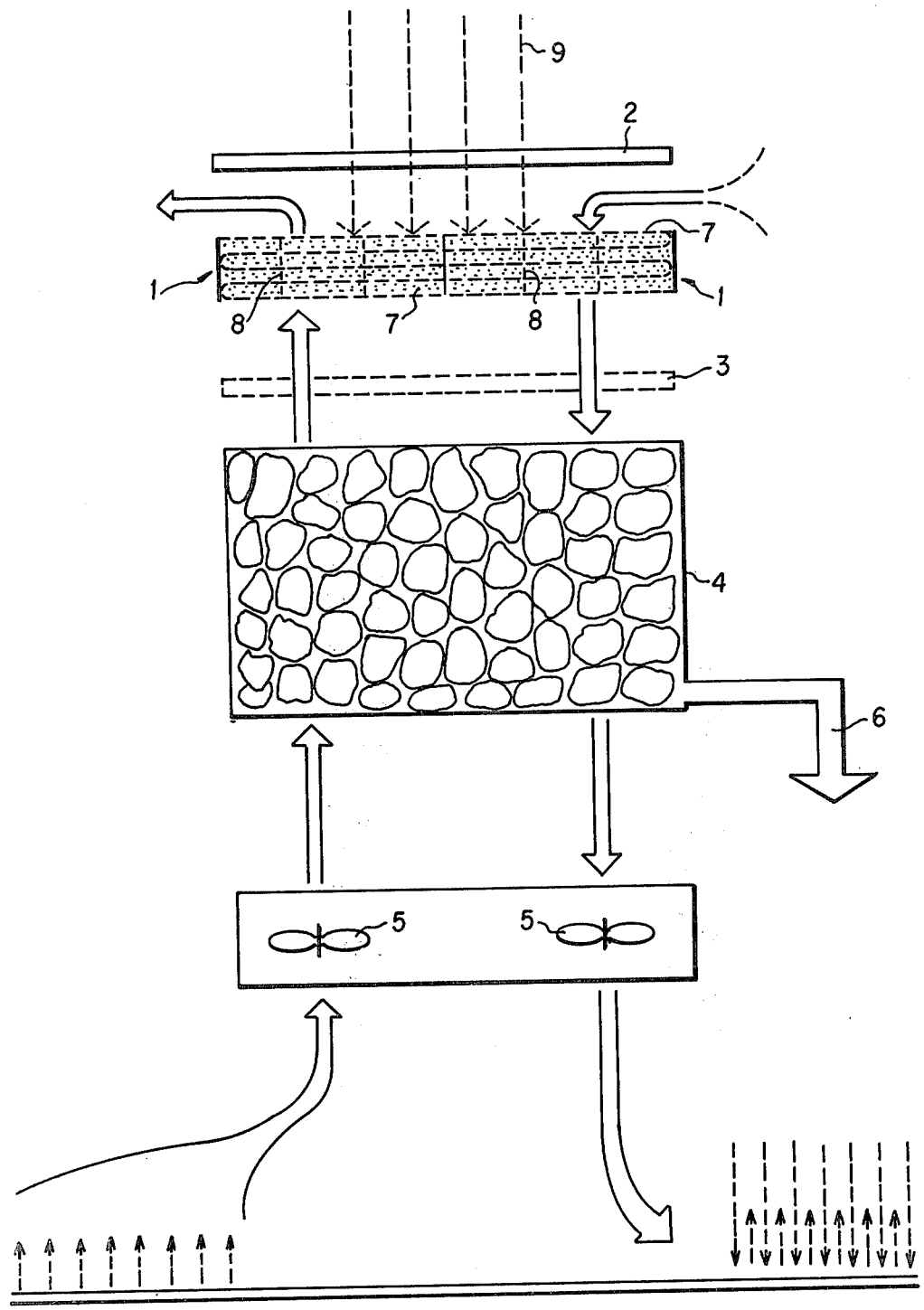
FIG. 1 shows a schematic representation of a plant for the recovery of water in accordance with the process according to the invention.

According to the invention, a dark colored substance is used as the adsorbent medium, which by the adsorption of the suns rays causes the heating up of the air passing through the adsorbent medium layer by day. Optionally or alternatively, for the purpose of heating the air passing through the adsorbent medium layer by day, a radiator heating by means of solarization is exposed to the flow of this air and/or one or more reflectors are used which direct the sun rays onto the adsorbent medium layer and/or the radiator, for heating same in order to heat the air passing around the radiator and/or through the adsorbent medium layer by day. The adsorbent medium is selected so that the temperature of the air passing through the layer at night lies within its adsorption range and so that the temperature of the heated air passing through the layer by day lies within its desorption range.

These measures allow a substantially greater rise in the temperature of the air passing through the adsorbent medium layer by day than in the already known process, so that on the one hand, the relative humidity of the air entering the layer can be decreased to a large extent in order to increase its adsorption capacity for the water stored in the layer, and on the other hand, the temperature difference between the night air and the heated air passing through the adsorbent medium layer by day, which difference strongly influences the water yield is increased greatly and depends less on the given difference in temperature of the outside air between day and night.

An important advantage of the inventive process as compared with the known process resides in the fact that the weight rate of air flow required for the desorption is considerably less that in the known process, whereby the quantity of water remaining in the used air after condensation is reduced.

A further feature of the invention resides in supplying heat again to the air passing through the adsorbent medium layer by day, while the air passes through the layer. This heat is generated by solarization in the radiator and is conducted into the interior of the layer.

By the intermediate heating of the regenerative air, its temperature can be kept constant or almost constant or actually increased again to the temperature originally prevailing at the entry into the layer while the air passes through the adsorbent medium layer.

Preferably, the temperature of the air passing through the adsorbent medium layer by day is increased to about 60° to 150° C. at its entry into the layer. Since, owing to the intermediate heating and/or the preceding intensive heating, the saturated air has a temperature which is still above the ambient temperature when leaving the adsorbent medium layer, it becomes possible to attain the cooling down of the air for the condensation of the water by heat exchange with the ambient air. Intensified cooling of the saturated air re-emerging from the adsorbent medium layer is effected preferably by heat exchange with a cold sink cooled at night. Cooling of the saturated air can also be effected by combined heat exchange with ambient air and a cold sink cooled at night.

In a combined heat exchange, cooling of the air is effected preferably first by heat exchange with the ambient air and then by heat exchange with the cold sink cooled at night. When a cold sink is used, according to a further feature of the invention, the air may be passed through the cold sink to cool the sink prior to being routed into the adsorbent medium layer.

A loss of water in the used air can be avoided almost completely if by day the air is passed through the adsorbent medium layer in a circuit, air from the environment being admixed to the air after condensation at each loop.

The plant for carrying out the process is characterized by an adsorbent medium layer serving for the adsorption and desorption of the water extracted from the humid air at night, the surface of which is to be exposed to solarization by day, and by a condenser, in which heat is to be extracted from the air passing through the adsorbent medium layer by day for the condensation of the water adsorbed from the adsorbent medium layer. As the adsorbent medium a dark colored substance is employed which, by the absorption of sun rays, causes the heating up of the air passing through the adsorbent medium layer by day. The substance is selected so that the temperature of the air passing through the layer at night lies within its range of adsorption and so that the temperature of the heated air passing through the layer by day lies within its range of desorption. Optionally or alternatively, a dark colored radiator to be heated by solarization is provided, which is to be exposed to the flow of air passing through the adsorbent medium layer by day, for heating up of this air and/or one or more relfectors for directing the sun rays onto the surface of the adsorbent medium layer and/or the radiator are provided.

According to one feature of the invention, the radiator is constructed as a flat structural component permeable to air and light, which is arranged above the adsorbent medium layer so as to be generated by the flow of air entering the adsorbent medium layer by day before its entry into the layer, so that it is heated thereby. Preferably, the flat structural component permeable to air and ligh is a web or net of metal wires or a perforated sheet. In order that the air, when passing through the adsorbent medium layer, can be heated again and again according to a further feature of the invention, the flat structural component consists of a heat-conductible metal and is passed downwardly from the top through the adsorbent medium layer in such a way that the air is forced to pass through the structural component within the layer when passing through the adsorbent medium layer. Preferably, a web of black anodized aluminum is selected as the flat structural component. Aluminum has the advantage of being relatively cheap and strongly heat-conductibel and being given by the black anodization a high absorption capacity for the sun rays.

A significant feature of the invention resides in the fact that the aluminum web is passed downwardly from the top in a serpentine or zigzag-line and that the adsorbent medium is embedded between the individual sections of the web. The adsorbent medium and the web jointly form a prefabricated, box-type, flat absorption and adsorption package.

Preferably, the web of the absorption and adsorption package is interconneced at its bend-points with the uppermost, transversely extending section by two lateral web sections so that a maximum of the heat absorbed in the uppermost web section is conducted downwardly into the adsorbent medium layer. Spacers may be arranged between the lateral sections interconnecting the bend-points.

These spacers connect the web sections extending transversely in the interior of the adsorbent medium layer with the upper web section, so that an intensified heat conductivity is made possible.

To increase the surface of the absorption and adsorption package, which is to be exposed to the sun rays, the surface of the package or the complete package is corrugated or zigzag-shaped.

When a plurality of absorption and adsorption packages are used, the absorption and adsorption packages are joined, preferably, by screwing together and being sealed against each other in order to avoid air streaming through the space between the absorption and adsorption packages.

The reflectors serving for an improved utilization of the rays are constructed preferably as flat or parabolic mirrors, which are arranged at the upper periphery of the adsorbent medium layer so that they direct the incident sun rays onto the surface of the adsorbent medium layer and, if present, onto the radiator, which may be, e.g., the aluminum web. As reflectors, a plurality of flat mirrors may be employed which are incorporated in the adsorbent medium layer, while being distributed over the surface of the layer. In place of flat mirrors, a ray-reflecting powder such as aluminum powder may be distributed in the layer.

When inclined mirrors are used, it is expedient if the absorption and adsorption packages are spaced apart horizontally and the space between the individual packages is covered by the mirrors projecting upwardly.

According to a further feature of the invention, a package of stones is used as the condenser, which at the same time serves as a cold sink. The stones are arranged below the adsorbent medium layer. As an alternative to the stones, a heat-exchanger with integral condenser surface may be used. In some instances it is expedient to combine the heat-exchanger with the cold sink, in which case the heat-exchanger is disposed above the cold sink, so that the air emerging from the adsorbent medium layer is passed first through the heat-exchanger and then through the cold sink.

Although commercially available silica gels or other presently known adsorbing agents may be employed in the process according to the present invention, it is expedient for obtaining a high efficiency of the plant if, as an adsorbent medium, a silica gel is used which is in a position to absorb from humid air having a relative humidity of only 25 to 30% at temperatures up to 30° C. a quantity of water of 30 to 40% of its total absorption capacity or 40 to 60% of its own weight. In order that the gel layer can absorb the incident sun rays, it is colored deep black, at least at its surface, preferably with soot. The quantity of soot suitably amounts to from about 0.05 to 0.03% based on the silica gel sol. The admixture of soot has only a very little effect upon the adsorption capacity of the silica gel. In any case, it is more advantageous to add intensely coloring soots in small quantities as opposed to large quantitites of less intensely coloring soots to the water glass solution or the reaction mixtue when the sol is formed.

Preferably, the silica gel is used in the form of coarsely-grained spheres having a diameter of, e.g., 5 to 8 mm and/or a granulate. Use of spheres as compared with granulate provides the advantage that the spaces defined between the spheres are substantially larger than in the compactly resting granulate, so that the absorption of solar energy is favored.

To facilitate the heat-exchange between the air passing through the silica gel layer and the silica gel, not only the spheres or the granulate defining the surface of the layer but also the whole of the spheres or the granulate is colored deep black.

The relatively rough surface of the silica gel spheres conditioned by the toning process and the preceding gelling process is advantageous for the absorption of solar energy.

According to a further feature of the invention, the adsorbent medium layer consists of several stacked layers of silica gels having different adsorption and desorption powers. The properties of these silica gels are adapted to the climatic conditions in respect of air temperature and air humidity, which conditions prevail at the location of the plant. The types of gel to be used have, e.g., the following properties:

TABLE I

| Type of gel | Height of larger cm | Ad-sorption temp. °C. | Rel. Air Humidity % | Quantity of adsorption % of own weight | De-sorption temperature °C. |
|---|---|---|---|---|---|
| E-granulate | 10–15 | 0–60 | 20–100 | 30–40 | 80–150 |
| E-shaped | 10–15 | 0–50 | 20–100 | 30–50 | 70–130 |
| M-shaped | 10–30 | 0–45 | 35–100 | 50–60 | 60–90 |
| W-shaped | 10–30 | 0–38 | 40–100 | 55–80 | 50–80 |
| W-shaped | 10–30 | 0–20 | 40–100 | 60–80 | 30–60 |
| Universal gel | 40–100 | 0–30 | 20–100 | 35–50 | 60–80 |

When several gel layers, one on top of the other, are used the possibility arises of operating the plant during desorption so that condensation of the water starts already in the lower layer, which provides an advantage in that the capacity of the condenser, which may be, e.g., a package of stones, is reduced.

Two to five layers of silica gel may be employed. Preferably three or four layers are utilized with E-gels, then E-M-gels, then M-gels and W-gels being arranged in series, starting at the top and proceeding downwardly. In a three layer configuration, a special E-gel is employed at the top, preferably one which is capable of absorbing 30 to 45% of water and which desorbs at 70°–90° C. Then follows a E-gel or M-gel which absorbs 40 to 50% of water and desorbs at 60°–85° C. The third and lowermost layer consists of a gel which is between M and E, desorbs 50 to 60% of water and desorbs at 55° to 75° or 70° C. In a four layer configuration, preferably a W-gel is used as the fourth layer, which absorbs 60 to 70% of water and desorbs at 50° to 65° C.

When absorption and adsorption packages are used in the plant, it is expedient if each layer of silica gel is embedded respectively between two parallel extending sections of the aluminum web. The thickness of the individual layers or the total height of the layer of gel is selected so that a complete charge and discharge of the gel is made possible in the available time period of a maximum of about 10 hours for each of the adsorption and the desorption steps. The total layer thickness of the gel layer is greater in a multilayer-arrangement than when only one type of gel is used for the whole layer. Total layer thickness of 60 to 90 mm are sufficient for the recovery of, e.g., 1 liter of water from a quantity of daytime air of 5 cmb at a night temperature of 25° C., with which the cooling down of the cold sink is commensurate, and at a desorption temperature and equivalent condensation temperature of 60° C. The air demand of the so-called push air amounts to only about 2 to 10% of the quantity of air required when a conventional type of gel is used. A loss of only 25 g of water per kg of dry air occurs in the used air.

The silica gels employed in the process according to the invention are produced in accordance with the process known from the Offenlegungsschrift mentioned at the beginning, as well as from U.S. Pat. application Ser. No. 747,474, filed Dec. 6, 1976.

According to a further feature of the invention, a translucent roof is arranged above the absorption and adsorption packages. This roof consists of single glass plates or double glass plates or plastic plates, preferably double polyacrylate plates. It is essential that the roof has a strong insulating effect and small reflection values.

According to a further feature of the invention, an insulating layer permeable to air is arranged between the absorption and adsorption packages and the condenser which is disposed below them and which may be, e.g., a package of stones. The insulating layer preferably consists of a perforated plate of aluminum, polyester or another plastic material. This insulating layer permeable to air serves among other things as a distributor for the saturated air emerging from the absorption and adsorption package.

Preferred embodiments of the invention are illustrated in the drawings and will hereinafter be described.

The plant for the recovery of water, which is illustrated schematically in FIG. 1, comprises a plurality of absorption and adsorption packages 1 which are joined and sealed against each other, a translucent roof 2 arranged above the absorption and adsorption packages and an insulating layer 3 which is permeable to air and arranged below the absorption and adsorption packages 1. Only two of the absorption and adsorption packages are shown in the drawing. A cold sink 4 consisting of a bed of stones is disposed below the insulating layer 3. Fans 5 are provided for advancing the air through the plant. The flow direction of the air at night is indicated by the arrows shown on the left hand side of the drawing. The arrows on the right hand side of the drawing indicate the flow direction of the air during the day. Arrow 6 indicates the water leaving the cold sink 4.

Each absorption and adsorption package 1 comprises a black anodized aluminum web 7 which is passed downwardly from the top in a zigzag-line. A layer of black colored silica gel spheres is arranged between every two parallel extending web sections. The web 7 is interconnected at the bend-points with the upper section of the web. Furthermore, spacers 8 are arranged between the bend-points, which spacers connect the upper section with the sections of the web 7 lying underneath. Arrows 9 indicate the incident sun rays.

In operation of the plant, humid air from layers close to the ground is sucked in by the fans 5 at night and passed through the cold sink 4, whereby the stones cool down. Thereafter, the air flows through the insulating layer 3 and then through the absorption and adsorption packages 1. While the air passes through the absorption and adsorption packages 1, the water contained in the humid air is adsorbed by the silica gel and the air is dried thereby. The dried night air exits at the upper side of the absorption and adsorption packages again and streams into the environment.

During the day, air passes in reverse order, first through the absorption and adsorption packages 1, then through the insulating layer 3 and thereafter through the cold sink 4. Subsequently, the air is delivered into the environment by the fan 5.

When entering the absorption and adsorption packages 1, the air is heated by heat exchange with the uppermost section of the web 7 and by the silica gel spheres defining the surface of the absorption and adsorption packages to a temperature which lies above the ambient temperature. Each uppermost section of the web 7 and also the silica gel spheres defining the surface of the absorption and adsorption packages have been heated by the incident sun rays 9. A portion of the heat absorbed by the uppermost section of the web 7 is conducted through the sections lying underneath, the spacers and the latweral boundaries of the absorption and adsorption packages into the interior of the absorption and adsorption packages so that the air is heated again and again while passing through the absorption and adsorption packages.

While passing through the absorption and adsorption packages 1, the heated air absorbs the humidity stored in the silica gel layer at night until the air is saturated. Then, the saturated air is routed into the cold sink 4 in which it cools down so that the water contained in it condenses on the surface of the stones. The condensed water is collected and conducted away.

Figure 2:
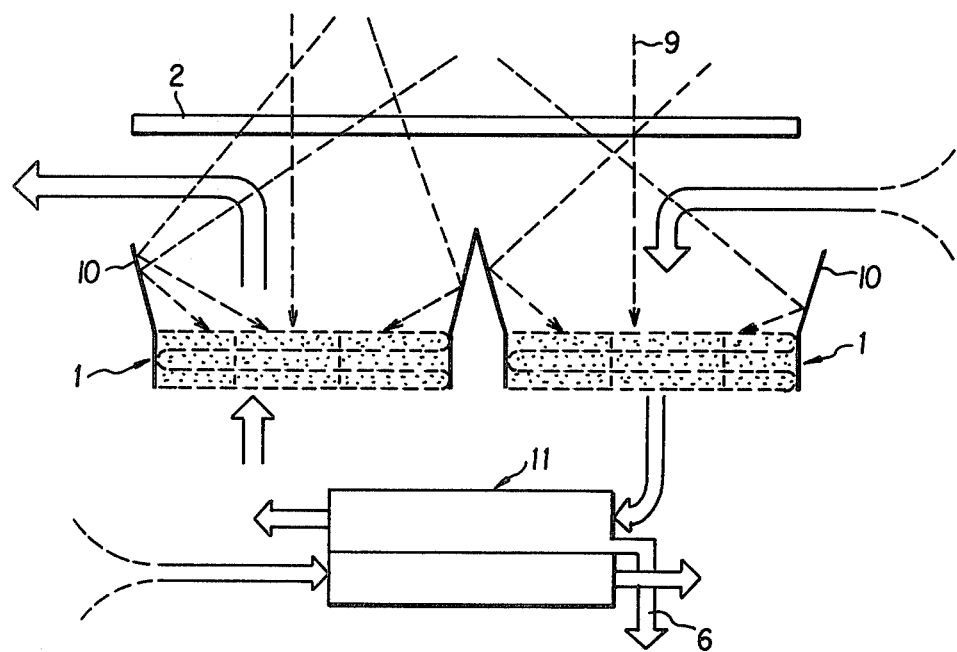
FIG. 2 shows a schematic representation of a modified plant for the recovery of water in accordance with the process according to the invention.

Those parts of the modified plant of FIG. 2 which are identical with the corresponding parts of the plant according to FIG. 1 are provided with the same reference numerals.

The absorption and adsorption packages 1 of the modified plant are arranged with horizontal spacings between them. At the upper periphery of the absorption and adsorption packages 1, inclined mirrors 10 extending on all sides are arranged, which direct the obliquely incident sun rays onto the surface of the absorption and adsorption packages. In place of a cold sink, the modified plant has a counterflow heat exchanger 11 which serves as a condenser. The spacers between the absorption and adsorption packages 1 are covered by mirrors projecting upwardly.

The operational mode of the modified plant is as follows: During the night, humid air is sucked in from layers close to the ground and routed directly into the absorption and adsorption packages 1. As in the plant according to FIG. 1, the night air passes upwardly from below through the absorption and adsorption packages 1 of the modified plant for adsorption. By day, ambient air enters the modified plant between the upper translucent roof and the absorption and adsorption packages 1. Since the reflection of the mirrors 10 produces an intensified solarization upon the surface of the absorption and adsorption packages 1, the air is heated more intensely at its entry into the absorption and adsorption packages 1 than in the plant according to FIG. 1. Owing to the increased heating up of the surface of the absorption and adsorption packages 1, likewise more heat is conducted through the web into the interior of the absorption and adsorption packages 1 than in the plant according to FIG. 1. After having left the absorption and adsorption packages, the air flows through the counterflow-heat exchanger 11 in the direction indicated. Heat is extracted in the counterflow-heat exchanger from the air coming from the absorption and adsorption packages by the ambient air passing through the counterflow-heat exchanger, so that the water condenses and can be conducted away.

Figure 3:
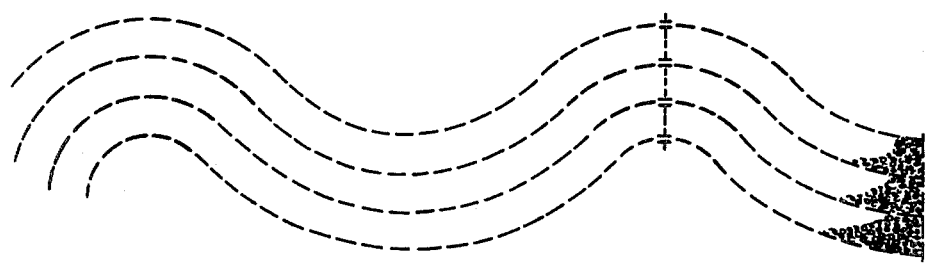
FIG. 3 shows a section through a corrugated absorption and adsorption package, the various layers of the adsorbent medium layer being outlined only.

FIG. 3 shows a corrugated absorption and adsorption package in section. Owing to the corrugated surface, a substantially larger surface area is made available for solarization than when the surface is flat.

The width of the meshes of the web and the thickness of the wires, respectively, amount to from about 5 to 2 mm and from about 1 to 2 mm in the flat configuration as well as in the corrugated configuration of the absorption and adsorption packages. The total thickness of the package amounts to from about 50 to 80 mm in the flat configuration and from about 20 to 50 mm in the corrugated configuration. In the corrugated configuration, two web layers may suffice, since, owing to the greatly enlarged surface of the corrugated package, more intense heating at the entry of the air into the package is effected than in the flat configuration. In both configurations, the distance between the two uppermost web layers is from about 15 to 20 mm. The distance between the web layers arranged further below is from about 20 to 40 mm. The spacers are disposed at a horizontal distance of from about 15 to 30 mm.

The mass of the aluminum is so big as to be in a position, if necessary, to conduct 50 to 70% of the solar energy incident upon the surface of the absorption and adsorption package, in order to carry out the intermediate heating even up to the next to last or the last layer, so that the temperature reached above is also attainable below.

The absorption and adsorption packages are uniform modules of, e.g., 1, 2 or more m², which have been pre-manufactured in the plant of the silica gel producer. 30 to 50 kg of silica gel per m² of the total area of the packages are contained in the packages. Since, owing to the fixed solar constant, no more than 6000 to 9400 kcal will be available at the respective location of the plant, no more than the stated quantity of silica gel per m² of the total area of the packages need be contained in the packages. The absorption and adsorption packages are designed so that 10 to 15 kg of water per m² can be recovered in 24 hours.

What is claimed is:

1. A plant for carrying out a process for recovering water from humid air, comprising:

a layer of an air-permeable water adsorbent silica gel capable of adsorbing water from humid night air at a first temperature and desorbing the adsorbed water when exposed to daytime air at a second temperature higher than said first temperature, said layer being oriented for exposure of its principal surface to the sun's rays and being dark colored at least on its exposed surface for absorption of solar heat;

means, including a blower, for propelling a stream of ambient daytime air through said water adsorbent silica gel layer to define an upstream and a downstream direction in the ambient daytime air stream;

means, including at least one generally flat component having a colored surface oriented for exposure to the sun's rays and being permeable to air and the sun's rays, said flat component being positioned above and upstream of said water adsorbent silica gel layer in the stream of daytime air and having a portion which is capable of conducting heat and which projects into said silica gel layer, for heating ambient daytime air to a higher temperature;

a cold-storage type condenser located downstream from said water adsorbent silica gel layer in the stream of daytime air for removing water from the stream of daytime air after it has passed through said water adsorbent silica gel layer; and means, including a blower, for propelling a stream of ambient humid night air at a temperature lower than said daytime air first through said condenser and thereafter through said layer of silica gel.

2. The plant according to claim 1, wherein the flat component permeable to air and light comprises a web or net of metal wires.

3. The plant according to claim 1, wherein the flat component permeable to air and light comprises a perforated sheet.

4. The plant according to claim 1, wherein said flat component comprises a metal capable of conducting heat and wherein said portion projecting into said layer of silica gel is shaped in such a way that the air passes through the portion of component within the layer while passing through said layer of silica gel.

5. The plant according to claim 4, wherein said flat metal component comprises a downwardly extending serpentine into said layer of silica gel and said silica gel is contained between the individual transversely extending serpentine layers of the component.

6. The plant according to claim 5, wherein the metal component is interconnected at each of its serpentine bend-points, by two lateral web sections, with the uppermost transversely extending layer of the serpentine metal component.

7. The plant according to claim 6, further including spacers arranged between said lateral web sections, said spacers connecting the lateral web sections extending within the silica gel layer with the web section located immediately above.

8. The plant according to claim 7, wherein the surface of the silica gel layer exposed to the sun's rays is corrugated or zigzag-shaped.

9. The plant according to claim 5, wherein said flat component comprises a web of black anodized aluminum.

10. The plant according to claim 1, further comprising at least one reflector for reflecting the sun's rays onto at least one of said flat component and said surface layer of said water adsorbent silica gel layer.

11. The plant according to claim 10, comprising a plurality of absorption and adsorption packages comprising one of said serpentine shaped flat metal components, whereby the silica gel layer together with the metal component forms a pre-fabricated, compact, box-type flat package, said packages being joined and sealed against each other.

12. The plant according to claim 11, wherein each said reflector comprises a flat or parabolic mirror arranged at the upper periphery of the water adsorbent silica gel layer so that it directs the incident sun rays onto the surface of at least one of said flat component and said exposed surface of said silica gel layer.

13. The plant according to claim 12, wherein said absorption and adsorption packages are spaced apart horizontally and the space between the individual packages is covered by said mirrors projecting upwardly.

14. The plant according to claim 11, further comprising a translucent roof arranged above said absorption and adsorption packages.

15. The plant according to claim 14, further comprising an insulated layer permable to air arranged between said absorption and adsorption packages and said condenser.

16. The plant according to claim 10, wherein said at least one reflector comprises a plurality of flat mirrors incorporated in and being distributed over the surface of said silica gel layer.

17. The plant according to claim 16, wherein said reflector comprises a sun ray-reflecting powder distributed in said silica gel layer.

18. The plant according to claim 1, wherein said cold-storage condenser comprises a package of stones serving as a cold sink and being arranged below said water adsorbent silica gel layer.

19. The plant according to claim 1, further comprising a heat exchanger having an integral condenser surface, said heat exchanger being located between said silica gel layer and said condenser.

20. The plant according to claim 19, wherein said heat exchanger is arranged above said cold-storage condenser and below said silica gel layer.

21. The plant according to claim 1, wherein said adsorbent silica gel layer comprises a silica gel capable of adsorbing from humid air having a relative humidity from about 25 to 30% at temperatures up to about 30° C. a water quantity of at least one of (A) from about 30 to 40% of its total absorption capacity and (B) 40 to 60% of its own weight.

22. The plant according to claim 21, wherein said silica gel is colored deep black with soot.

23. The plant according to claim 22, wherein said silica gel is used in the form of coarse-grained spheres or granulate.

24. The plant according to claim 23, wherein said adsorbent silica gel layer comprises a plurality of stacked layers of silica gels having different adsorption and desorption characteristics.

25. A plant for carrying out a process for recovering water from humid air, comprising:
a layer of an air-permeable water adsorbent medium capable of adsorbing water from humid night air at a first temperature and desorbing the adsorbed water when exposed to daytime air at a second temperature higher than said first temperature;
means for propelling a stream of ambient daytime air through said adsorbent medium layer to define an upstream and a downstream direction in the ambient daytime air stream;
means, including at least one air-permeable dark colored layer comprising a radiator member and a dark colored surface layer of adsorbent medium layer oriented for exposure to the sun's rays and positioned upstream of said adsorbent medium layer in the stream of daytime air, for heating ambient daytime air to a higher temperature, said radiator member comprising a flat structural component permeable to air and light, which is arranged above the adsorbent medium layer to be penetrated by the flow of daytime air entering the adsorbent medium layer, said flat structural component comprising a metal capable of conducting heat and including a portion passing downwardly from the top through the adsorbent medium layer in such a way that the air passes through the structural component within the layer while passing through the adsorbent medium layer, said portion being passed downwardly from the top in a serpentine line and the adsorbent medium being embedded between the individual sections of the serpentine portion, whereby the adsorbent medium together with the metal component forms a pre-fabricated, compact, box-type, flat absorption and adsorption package;
a condenser located downstream from said adsorbent medium layer in the stream of daytime air for removing water from the stream of daytime air after it has passed through said adsorbent medium layer; and
at least one reflector for reflecting the sun's rays onto at least one of said radiator member and said surface layer of said adsorbent medium layer.

26. The plant according to claim 25 wherein said flat structural component comprises a web of black anodized aluminum.

27. The plant according to claim 26, wherein the web is interconnected at each of its bend-points, by two lateral web sections, with the uppermost transversely extending section of the web.

28. The plant according to claim 7, further including spacers arranged between said lateral web sections, said spacers connecting the lateral web sections extending within the adsorbent medium layer with the web section located immediately above.

29. The plant according to claim 28, wherein the surface of the adsorbent medium layer exposed to the sun's rays is corrugated or zigzag-shaped.

30. The plant according to claim 25, including a plurality of said absorption and adsorption packages joined and sealed against each other.

31. The plant according to claim 30, wherein each said reflector comprises a flat or parabolic mirror arranged at the upper periphery of the adsorbent medium layer so that it directs the incident sun rays onto the surface of at least one of the adsorbent medium layer and the radiator.

32. The plant according to claim 31, wherein said absorption and adsorption packages are spaced apart horizontally and the space between the individual packages is covered by said mirrors projecting upwardly.

33. The plant according to claim 30, wherein said at least one reflector comprises a plurality of flat mirrors incorporated in and being distributed over the surface of said adsorbent medium layer.

34. The plant according to claim 25 wherein said condenser comprises a package of stones serving as a cold sink and being arranged below said adsorbent medium layer.

35. The plant according to claim 25, wherein said condenser comprises a heat exchanger having an integral condenser surface.

36. The plant according to claim 35, wherein said heat exchanger is combined with a cold sink, said heat exchanger being arranged above said cold sink.

37. The plant according to claim 25, wherein said adsorbent medium comprises a silica gel capable of adsorbing from humid air having a relative humidity from about 25 to 30% at temperatures up to about 30° C. a water quantity of at least one of (A) from about 30 to 40% of its total absorption capacity and (B) 40 to 60% of its own weight.

38. The plant according to claim 25, further comprising a translucent roof arranged above said absorption and adsorption packages.

39. The plant according to claim 38, further comprising an insulating layer permeable to air arranged between said absorption and adsorption packages and said condenser.

* * * * *